Aug. 23, 1955  H. M. BROWN  2,715,963
GRAIN CLEANER
Filed April 29, 1952  2 Sheets-Sheet 1
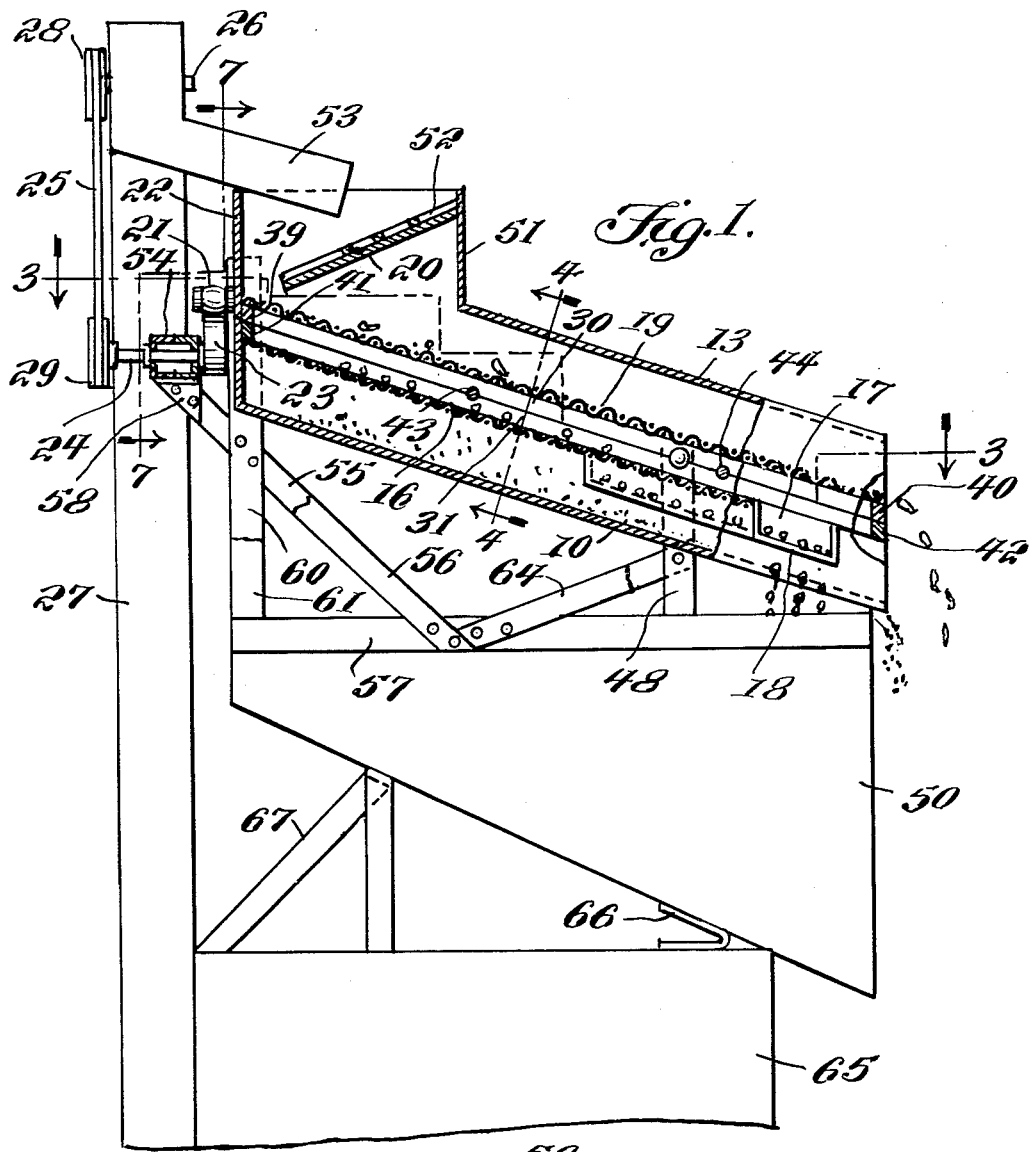
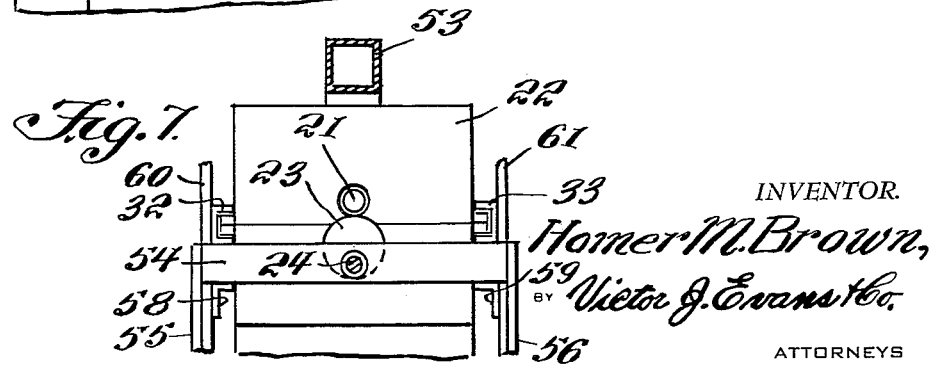
INVENTOR.
Homer M. Brown,
BY Victor J. Evans & Co.
ATTORNEYS Aug. 23, 1955   H. M. BROWN   2,715,963
GRAIN CLEANER
Filed April 29, 1952   2 Sheets-Sheet 2
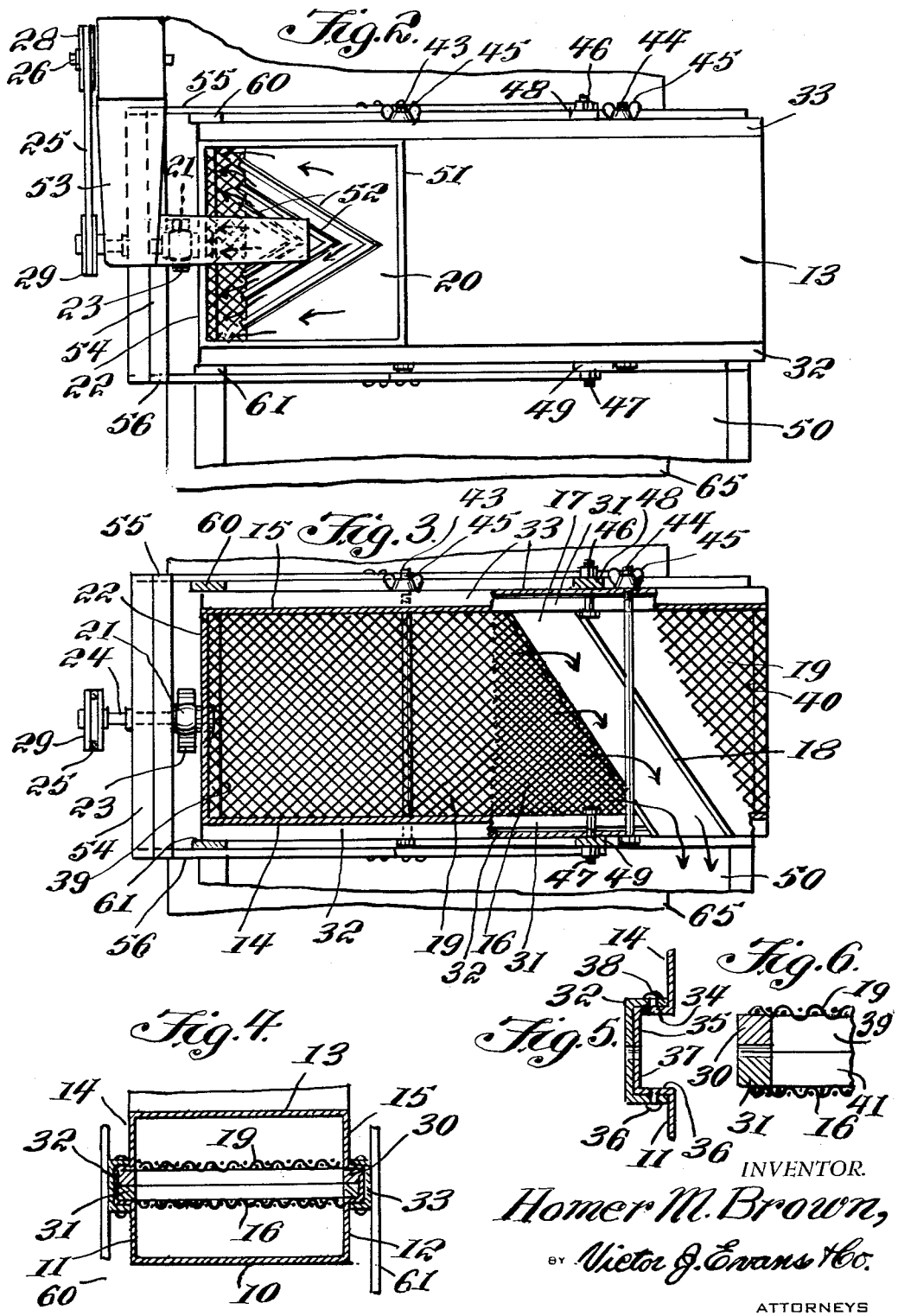

United States Patent Office 2,715,963
Patented Aug. 23, 1955

2,715,963

GRAIN CLEANER

Homer M. Brown, Imperial, Nebr.

Application April 29, 1952, Serial No. 284,921

3 Claims. (Cl. 209—319)

This invention relates to screens and other grain cleaning devices used in combination with elevators, particularly of combines and other threshing machines, and in particular an inclined chute having spaced parallel screens therein with a distributor at the upper or receiving end of the chute, a diagonally disposed grain receiving chute extended across the opposite end of the lower screen and vibrating means for shaking the chute and screens.

The purpose of this invention is to provide means that may be incorporated in a threshing machine or the like for efficiently removing leaves, stalks and other refuse and also the small weed seed that ordinarily pass into sacks and bins with the grain.

With the conventional type of grain cleaner it is difficult to remove the finely ground leaves, stalks, and also the finely ground weed seeds as the grain is transferred from the grain elevator of the machine to the sacks, and wheat with weed seeds and fine particles of leaves and stalks therein is not acceptable to the average grain elevator. With this thought in mind this invention contemplates a shaker unit including inclined coarse and fine screens with means for distributing grain over the screens and with means for removing the grain from the screens after the weed seed and refuse are removed therefrom.

The object of this invention is, therefore, to provide an improved grain cleaning unit that is so constructed that it may be combined with a conventional threshing machine or combine.

Another object of the invention is to provide means for vibrating a grain cleaning unit adapted to be installed in a combine or threshing machine, from the grain elevator of the machine.

A further object of the invention is to provide an improved grain cleaning unit for use in combination with threshing machines, combines, and the like in which the unit is of a simple and economical construction.

With these and other objects and advantages in view the invention embodies an inclined chute, rectangular-shape in cross section having spaced inclined screens, extended longitudinally therethrough with a spreader or distributing baffle in the upper end, a grain deflecting trough in the lower end and with a shaker element adapted to be actuated by the head shaft of a grain elevator by which grain is delivered to the cleaner.

Other features and advantages of the invention will appear from the following description taken in connection with the drawings, wherein:

Figure 1 is a view showing a longitudinal section through the improved grain cleaner with parts broken away and shown in elevation and with part of a combine upon which the grain cleaner is positioned also shown in elevation.

Figure 2 is a plan view of the improved grain cleaner.

Figure 3 is a sectional plan through the cleaner taken on line 3—3 of Fig. 1.

Figure 4 is a cross section through the cleaner taken on line 4—4 of Fig. 1.

Figure 5 is a detail on an enlarged scale showing a section through one side of the screen mounting elements of the cleaner.

Figure 6 is a detail similar to that shown in Fig. 5 illustrating the strips upon which the edges of the screens are mounted.

Figure 7 is a view taken on line 7—7 of Fig. 1 showing the end of the grain cleaning unit in elevation and showing a chute for delivering grain to the unit in section.

Referring now to the drawings wherein like reference characters denote corresponding parts the improved grain cleaner of this invention includes a chute having a base 10 with upwardly extended side walls 11 and 12, an upper section or cover having a panel 13 with side walls 14 and 15, a lower screen 16 having a diagonally positioned opening 17 therein, a trough 18 positioned below the opening 17, an upper screen 19, a distributing baffle or spreader 20, and a roller 21 mounted on an end wall 22 of the chute and positioned to coact with an eccentric 23 on a shaft 24 which is rotated by a belt 25 from a head shaft 26 of a grain elevator 27, the belt being trained over pulleys 28 and 29.

The mesh of the upper screen 19 is such that grains of wheat pass therethrough whereas the screen 16 is of comparatively fine mesh permitting only the fine seed of weeds to pass therethrough. The edges of the screen 19 are mounted on strips 30 and the corresponding edges of the screen 16 are mounted on similar strips 31, as illustrated in Fig. 6. The strips 30 and 31 are positioned in a channel shaped section in each side of the chute which is formed as illustrated in Fig. 5 wherein the meeting edges of the side walls of the chute are secured in channels 32 and 33 with the walls 14 and 15 having horizontally disposed sections 34 and vertical sections 35 and the walls 11 and 12 having corresponding horizontal sections 36 and vertical sections 37. The horizontal sections of the plates forming the side walls are secured to flanges of the channels 32 and 33 with rivets 38.

With the strips 30 and 31 of the screen nested in these channel shaped sections the screens are readily removable and replaceable.

The strips 30 of the screen 19 are connected, at the ends, with transversely disposed strips 39 and 40 and similar strips 41 and 42 are positioned at the end of the screen 16 thereby forming continuous screen frames. The screen frames may be secured in position with bolts 43 and 44, the ends of which are provided with wing nuts 45 to facilitate removing the bolts when it is desired to change or clean the screens.

The screen frames are also provided with bolts 46 and 47 that extend through posts 48 and 49 to provide supporting means for the lower end of the chute, the bolts also extending through side walls of the chute.

The trough 18 is suspended from the lower strips 31 of the screen 16 and as grain dropping through the screen 19 and traveling downwardly on the screen 16 reaches the trough 18 it is carried to one side from which point it drops into a grain bin as indicated by the numeral 50.

The baffle 20 is positioned between extensions at the upper ends of the side walls 14 and 15 and the upper end is positioned against an intermediate wall 51 which is spaced from and parallel to the end wall 22. The baffle is provided with V-shaped ridges 52 which carry the grain laterally evenly distributing the grain over the upper screen 19.

The upper end of the chute is positioned whereby grain from the elevator 27 and delivered by a chute or spout 53 to the grain cleaner is deposited upon the baffle 20, from which it drops by gravity to the upper screen 19.

The roller 21 is journaled on the end plate 22 of the chute and the shaft 24 upon which the cam or eccentric 23 is mounted is journaled in a transversely disposed beam 54 which is supported by struts 55 and 56 from a base frame 57. The beam 54 is connected to the struts with clip angles 58 and 59 and to guides or posts 60 and 61 with channel irons 62 and 63. The struts 55 and 56 support the upper ends of the posts 60 and 61 and similar struts 64, which extend from the frame 67 to the posts 48 and 49, support the posts.

The grain bin 50, in the design shown, is mounted on a combine, as indicated by the numeral 65 with a bracket 66 and a support, as indicated by the numeral 67. It will be understood, however, that the grain bin and chute may be supported by other suitable means.

With the parts arranged in this manner grain from the elevator 27 is deposited upon the baffle 20 from which it is distributed to the upper screen 19 and as it travels downwardly on the upper screen leaves, stalks, and other debris or refuse are taken out by the upper screen with the grain dropping through upon the lower screen and with the fine weed seed dropping through the lower screen upon the base 10 of the lower section of the chute. The clean grain drops into the trough 18 which deposits the grain into a bin, such as the bin 50.

It will be understood that the cam 23 provides a slight vibration which keeps the grain moving continuously and also stimulates the movement of the trash, weed seed, and the like.

It will be understood that modifications may be made in the design and arrangement of the parts without departing from the spirit of the invention.

What is claimed is:

1. In a grain cleaner, the combination which comprises an upper inclined screen having longitudinally longitudinally disposed spacing strips on the lower surface and at the edges thereof, a lower inclined screen positioned below the upper inclined screen and having spacing strips on the upper surface and at the edges thereof, the upper surfaces of said spacing strips of the lower screen being positioned in meeting relation with the lower surfaces of the spacing strips of the upper screen, an inclined chute having a base, a cover, and side walls in which the screens are positioned and said side walls of the chute having longitudinally disposed channels therein in which edges of the upper and lower screens and the strips thereon are positioned, a distributing baffle mounted in the upper end of the chute, an elevator for supplying grain to the chute, a spout positioned to carry grain from the elevator to the distributing baffle, means actuated by the elevator for vibrating the chute and screens, a grain bin positioned below the chute, and means for delivering grain from the lower screen to the grain bin.

2. In a grain cleaner, the combination which comprises an upper inclined screen having longitudinally disposed spacing strips on the lower surface and at the edges thereof, a lower inclined screen positioned below the upper inclined screen and having spacing strips on the upper surface and at the edges thereof, the upper surfaces of said spacing strips of the lower screen being positioned in meeting relation with the lower surfaces of the spacing strips of the upper screen, an inclined chute having a base, a cover, and side walls in which the screens are positioned and said side walls of the chute having longitudinally disposed channels therein in which edges of the upper and lower screens and the strips thereon are positioned, a distributing baffle mounted in the upper end of the chute, an elevator for supplying grain to the chute, a spout positioned to carry grain from the elevator to the distributing baffle, means actuated by the elevator for vibrating the chute and screens, a grain bin positioned below the chute, said lower screen having a diagonally disposed slot in the lower portion, and a diagonally disposed trough positioned below the slot of the lower screen whereby grain dropping through said slot is deposited in said grain bin.

3. In a grain cleaner, the combination which comprises an upper inclined screen having longitudinally disposed spacing strips on the lower surface and at the edges thereof, a lower inclined screen positioned below the upper inclined screen and having spacing strips on the upper surface and at the edges thereof, the upper surfaces of said spacing strips of the lower screen being positioned in meeting relation with the lower surfaces of the spacing strips of the upper screen, an inclined chute having a base, a cover, and side walls in which the screens are positioned and said side walls of the chute having longitudinally disposed channels therein in which edges of the upper and lower screens and the strips thereon are positioned, a distributing baffle mounted in the upper end of the chute, an elevator for supplying grain to the chute, a spout positioned to carry grain from the elevator to the distributing baffle, means actuated by the elevator for vibrating the chute and screens, a grain bin positioned below the chute, said lower screen having a diagonally disposed slot in the lower portion, and a diagonally disposed trough positioned below the slot of the lower screen whereby grain dropping through said slot is deposited in said grain bin, the mesh of said upper screen being such that grain passes through the screen with trash being separated from the grain and the mesh of the lower screen being such that weed seed passes therethrough with the grain passing through said diagonally disposed slot into the trough and from the trough into the bin.

References Cited in the file of this patent

UNITED STATES PATENTS

| | | |
|---|---|---|
| 95,674 | Foster | Oct. 12, 1869 |
| 200,638 | Woodruff | Feb. 26, 1878 |
| 640,734 | Beadell | Jan. 9, 1900 |
| 908,970 | Deegan | Jan. 5, 1909 |
| 956,776 | McCoy | May 3, 1910 |
| 1,207,262 | Alwart | Dec. 5, 1916 |
| 1,610,353 | Bland | Dec. 14, 1926 |

FOREIGN PATENTS

| | | |
|---|---|---|
| 16,101 1894 | Great Britain | June 22, 1895 |
| 250,503 | Germany | Oct. 18, 1911 |
| 527,197 | France | Oct. 21, 1921 |
| 638,888 | Great Britain | June 14, 1950 |